May 6, 1958 T. C. STEPHENS 2,833,919
JITTER ALLEVIATING SYSTEM FOR A SCOPE
Filed March 5, 1953 3 Sheets-Sheet 1

INVENTOR.
THOMAS C. STEPHENS
BY
Marvin Moody
ATTORNEY

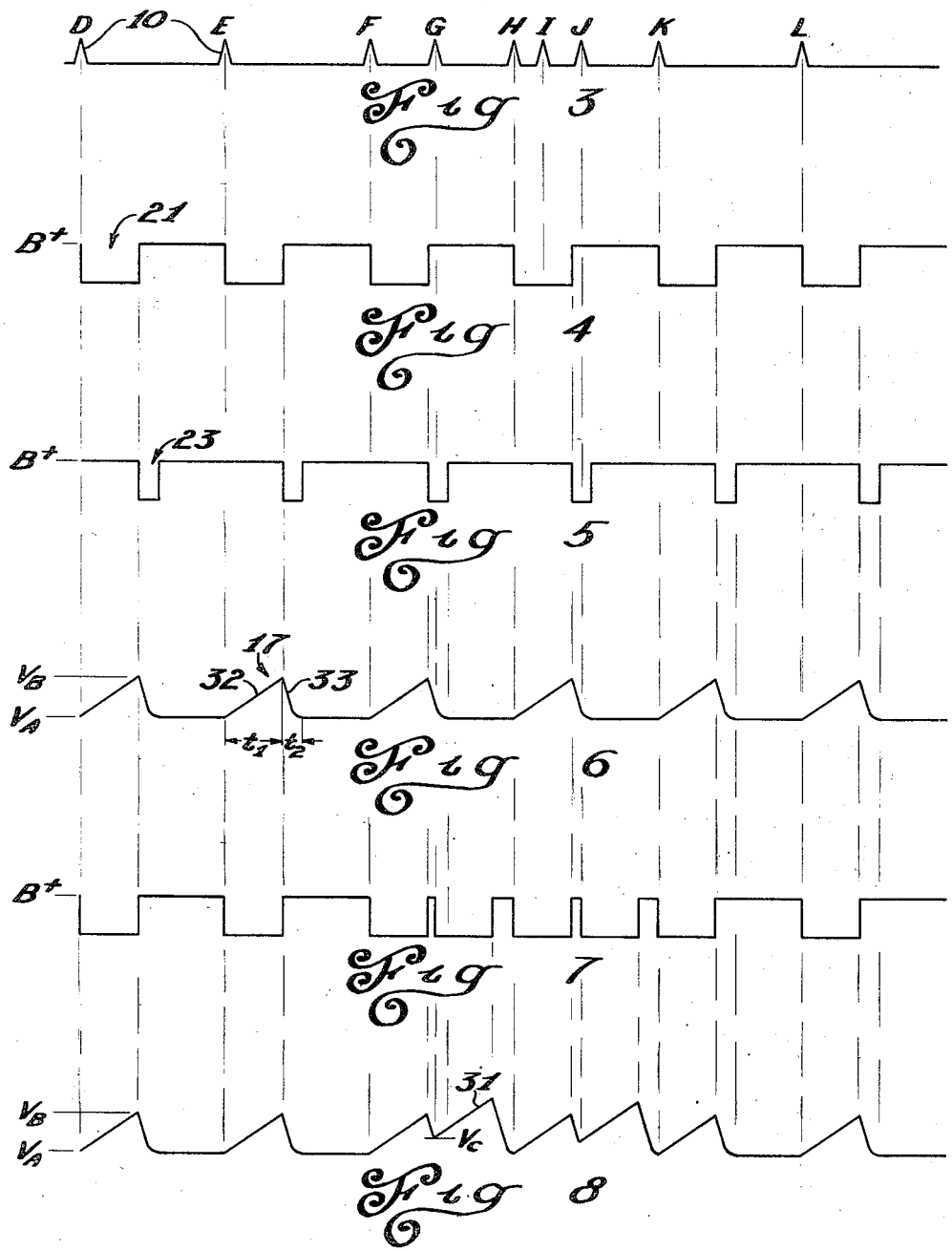

May 6, 1958  T. C. STEPHENS  2,833,919
JITTER ALLEVIATING SYSTEM FOR A SCOPE
Filed March 5, 1953  3 Sheets-Sheet 3

INVENTOR.
THOMAS C. STEPHENS
BY
Morin Moody
ATTORNEY

United States Patent Office 2,833,919
Patented May 6, 1958

2,833,919

JITTER ALLEVIATING SYSTEM FOR A SCOPE

Thomas C. Stephens, Cedar Rapids, Iowa, assignor to Collins Radio Company, Cedar Rapids, Iowa, a corporation of Iowa Application March 5, 1953, Serial No. 340,582

4 Claims. (Cl. 250—27)

This invention relates in general to a jitter alleviating system for a cathode ray scope and in particular to an electronic circuit which prevents jitter on the scope of radar which has a random pulse repetition rate.

For an understanding of radar with a random pulse repetition rate, the reader is referred to Hancock Patent No. 2,614,218 issued to the assignor of this application on October 14, 1952. Such radar is particularly useful because of its anti-jamming properties. It has a transmitted pulse rate which varies over wide limits which might be, for example, 1000 to 4000 pulses per second.

In order to obtain a picture on an oscilloscope, it is well known that its sweep circuit must be in synchronism with the signal on its other axis.

The sweep circuit in random pulse radar must therefore be in synchronism with the random transmitted puse in order to obtain the required target information on its scope. Although the sweep circuit saw tooth pulse rate will vary, all individual saw tooth pulses must be identical in shape.

The echo "pip" received from the target will appear on the screen at a specific distance from the start of the sweep line. The distance between the "pip" picture and the beginning of the sweep line is proportional to target distance. If the sweep line should begin at different places on the screen, the echo "pip" will appear to jump about on the screen. This undesired movement of the echo "pip" is known as jitter and leads to inaccuracy in range measurements and gives a distorted picture.

In the conventional sweep circuit, jitter will occur if the radar trigger pulse occurs before the sweep circuit has had time to recover from a previous pulse. Since the circuit has not had time to discharge to a reference voltage, the new saw tooth pulse will begin at a higher voltage and cause the scope sweep line to begin at a different place on the screen. It is, therefore, the principal object of this invention to prevent jitter from occurring on a radar screen.

The purpose of this invention is accomplished by providing a gate which locks out the sweep circuit during its recovery time. (The term, gate, is used in this specification to mean a positive or negative pulse). Upon termination of a sweep circuit gate, a lock out gate is initiated which biases the trigger tube for the sweep circuit below cut-off so that no trigger pulses can be accepted during the recovery time for the sweep circuit.

Other objects, features and advantages will become apparent from the following description and drawings, in which:

Figure 3 illustrates random trigger pulses on a time base;

Figure 4 shows the series of sweep circuit gates initiated by the pulses of Figure 3;

Figure 5 shows the lock out gates initiated by the sweep circuit gates of Figure 4;

Figure 6 shows the sweep circuit output wave obtained from this invention when it is initiated by the pulses of Figure 3;

Figure 9:
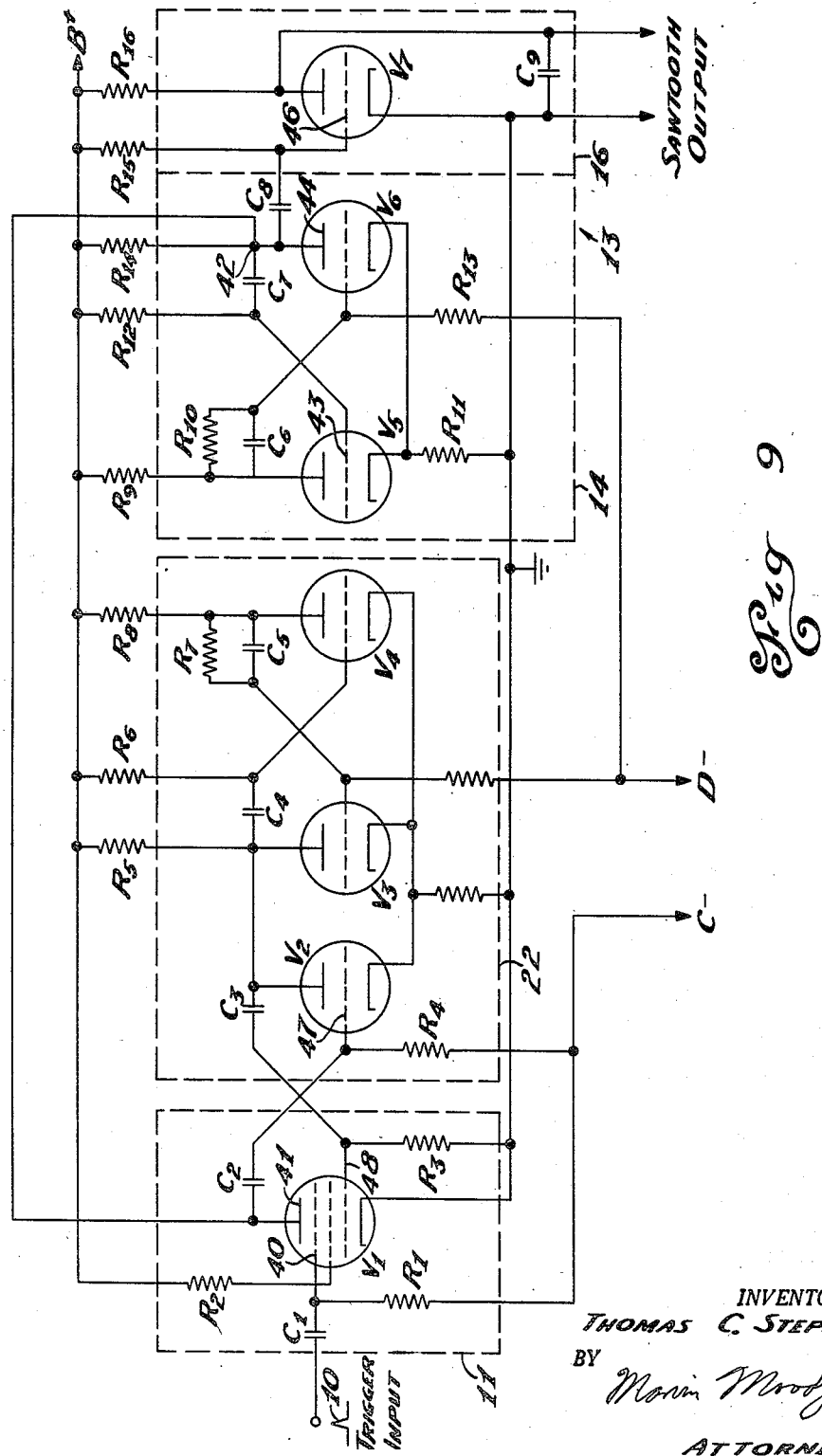

Figure 7 demonstrates the sweep circuit gates which would be obtained from a conventional sweep circuit when initiated by the pulses of Figure 3;

Figure 8 demonstrates the pulse form that would be obtained from a conventional sweep circuit when initiated by the pulses of Figure 3; and Figure 9 is a detailed circuit diagram of one embodiment of this invention.

Figure 2:
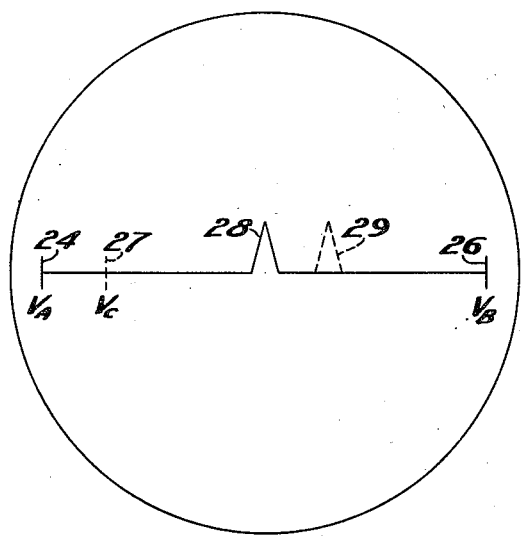
Figure 2 illustrates jitter on the screen of a cathode ray tube.

The general theory of sweep circuit operation is well known in the art and will not be explained in detail. Saw tooth pulse 17, shown in Figure 6, represents the typical shape for a sweep circuit output pulse. It has a rising portion 32 which begins at a quiescent voltage $V_a$ and rises to a voltage $V_b$ in time $t_1$. The rising portion 32 causes the oscilloscope electron beam to sweep horizontally across the screen in Figure 2 from point 24 to point 26.. The beginning point 24 is determined by the quiescent voltage $V_a$ If the rising portion should occasionally start at some other voltage such as $V_c$ in Figure 8, the sweep line on the screen would not begin at point 24 in Figure 2, but at another point such as point 27 Since the position of the echo "pip" on the screen is a predetermined distance from the beginning of a sweep line, the picture will appear to jitter from its proper position 28 to another position 29 when the sweep line begins at voltage $V_c$ instead of voltage $V_a$.

When the pulse 17 in Figure 6 reaches its peak at voltage $V_b$, a condenser is discharged in time $t_2$ which causes pulse 17 to decline to the quiescent voltage $V_a$ via declining portion 33. The time $t_2$ is known as the recovery time for the sweep circuit generator. If a trigger pulse should arrive in a conventional sweep circuit during time $t_2$, a new pulse would begin at the higher voltage $V_c$ in Figure 8 and would cause jitter. This invention prevents a trigger pulse from initiating a new saw tooth pulse during time $t_2$ and therefore does not allow any saw tooth pulse to begin at any voltage other than $V_a$.

Figure 1:
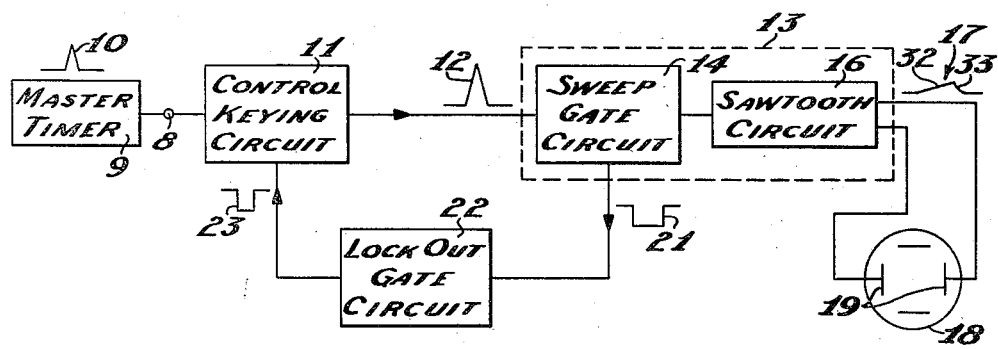
Figure 1 is a block diagram of this invention.

Referring to Figure 1, an external source such as the master timer 9 described in Patent No. 2,614,218, is connected to a terminal 8 and furnishes a random rate trigger pulse 10 which is received by a control keying circuit 11 that transmits an amplified trigger pulse 12 to trigger a sweep gate circuit 14 of a sweep circuit generator 13.

The sweep gate circuit 14 produces a negative sweep circuit gate 21 which controls the duration of the rising portion 32 of the output saw tooth pulse 17 produced by a saw tooth circuit 16 in generator 13. The termination of sweep circuit gate 21 trips a lock out gate circuit 22 which produces a negative lock out gate 23 that biases keying circuit 11 below cut off so no new trigger pulse 10 will be passed for the duration of gate 23. The duration of lock out gate 23 is such that it is equal to or slightly greater than the recovery time for sweep circuit generator 13. Therefore no saw tooth pulse can be initiated during the recovery period and all saw tooth pulses must begin at the quiescent voltage level, $V_a$ in Figure 6.

The output of saw tooth circuit 16 is connected to plates 19 of cathode ray tube 18.

Figure 9 shows detailed circuitry for one embodiment of this invention. A normally conducting pentode tube $V_1$ is contained in the control keying circuit 11.

The lock out gate circuit 22 is a one-shot multivibrator which contains a normally non-conducting trigger tube $V_2$, a normally non-conducting triode $V_3$, and a normally conducting triode $V_4$.

Sweep gate circuit 14 comprises a normally conducting triode $V_5$ and a normally non-conducting triode $V_6$ as the tubes for a one-shot multivibrator to produce the sweep circuit gate 21.

Saw tooth circuit 16 has a normally conducting triode $V_7$ as the saw tooth switch of generator 13.

The plate 41 of tube $V_1$ is connected at point 42 to the plate 44 of tube $V_6$. Resistor $R_{14}$ serves as load resistor for tubes $V_1$ and $V_6$. Plate 44 of tube $V_6$ is connected to the grid 43 of tube $V_5$ through condenser $C_7$, to the grid 46 of tube $V_7$ through condenser $C_8$, and to the grid 47 of tube $V_2$ through condenser $C_2$.

A bias voltage C minus biases tube $V_2$ below cut off, and a bias voltage D minus biases tubes $V_3$ and $V_6$ below cut off.

The lock out and sweep circuit gates are produced in the embodiment of Figure 9 by one-shot multivibrators, but it is to be understood that any other controllable type of gate circuits would also serve as well in this invention.

When a positive trigger pulse 10 is received on the suppressor grid 40 of tube $V_1$, a pulse of current is sent from plate 41 through resistor $R_{14}$ which drops the plate voltage of tube $V_6$ and therefore drops the voltage on grid 43 of tube $V_5$ below cut-off to initiate a negative gate 21 across the plate of tube $V_6$.

As the gate 21 begins across tube $V_6$, the voltage drop is coupled to grid 46 through condenser $C_8$ to bias tube $V_7$ below cut-off for the duration of the gate. The conducting quiescent plate voltage of $V_7$ is $V_a$, and then changes to its non-conducting voltage B plus.

Condenser $C_9$ begins to charge and this forms rising portion 32 of pulse 17 in Figure 6. At the end of the gate 21, the bias of tube $V_7$ goes above cut-off, its plate voltage drops to quiescent level $V_a$, and condenser $C_9$ discharges through tube $V_7$ to form declining portion 33 of pulse 17.

As the negative sweep circuit gate 21 ends, the voltage rise on plate 44 causes a positive pulse to appear on grid 47 of tube $V_2$ through condenser $C_2$ which initiates the multivibrator of lock out gate circuit 22. A negative lock out gate 23 then begins across tube $V_3$ and appears on control grid 48 of tube $V_1$ to bias it below cut-off.

Tube $V_1$ is non-conducting for the period of the lock out gate 23 and any trigger pulses 10 arriving on grid 40 during this period are without effect. The duration of the lock out gate 23 should be equal to or slightly greater than the duration $t_2$, of the discharge of condenser $C_9$. The time constants for the resistor-capacitor combinations must therefore be chosen accordingly.

Figure 3 shows the time spacing of a series of random trigger pulses 10D through 10L. Figure 4 shows sweep circuit gates 21 caused by trigger pulses 10, and Figure 5 shows the resulting lock out gates 23 of this invention. It will be noted that pulses G, I and J are rejected and have no effect. Pulses G and J occur during the recovery time and are rejected by the lock out gate 23. Pulse I occurs during a sweep circuit gate 21 and can have no effect. Figure 6 shows the resulting saw tooth pulses 17 caused by the sweep circuit gates 21 of Figure 4.

Figures 7 and 8 illustrate what would happen if the series of trigger pulses 10 in Figure 3 are injected into a conventional saw tooth generator without a lock out gate circuit. The irregular shape of saw tooth pulse 31 which is initiated during circuit recovery time will be noted.

Although this invention has been described with respect to preferred embodiments thereof, it is not to be so limited, as changes and modifications may be made which are within the intended scope as defined by the following claims.

I claim:
1. A jitter alleviating circuit for a cathode ray tube comprising, a control trigger circuit producing trigger pulses, a control trigger tube in said trigger circuit, a saw tooth generator circuit which includes a first single-shot multi-vibrator connected to said trigger tube and producing a sweep circuit gate, a saw tooth circuit connected to and controlled by said first multi-vibrator, a second single-shot multi-vibrator connected to said first multi-vibrator and producing a lock out gate, and said second multi-vibrator connected to said control trigger tube so as to cut it off during the period of a lock out gate.

2. A jitter alleviating circuit comprising, a pentode trigger tube which receives trigger pulses on its suppressor grid, a first multi-vibrator circuit connected to the plate of said pentode and producing a sweep circuit gate, a second multi-vibrator circuit connected to said first multi-vibrator to produce a negative lock out gate which is initiated by the termination of each sweep circuit gate, a control grid in said pentode tube connected to said second multi-vibrator and receiving said lock out gate to bias said pentode tube beyond cutoff for the duration of said lock out gate.

3. Disabling means for a saw-tooth circuit comprising, a sweep gate circuit connected to the input of said saw-tooth circuit to control the duration of the sweep pulses produced by said saw-tooth circuit, a multi-vibrator connected to the output of said sweep gate circuit to produce lock-out pulses having a duration greater than the recovery time of said sweep pulses, said multivibrator initiated by the termination of an output pulse from said sweep gate circuit to produce said lock-out pulse, a control keying circuit connected to the output of said multivibrator, the output of said control keying circuit connected to the input of said sweep gate circuit, a source of trigger pulses connected to the input of said control keying circuit, and said keying circuit disabled by said lock-out pulses for the duration of each of said pulses.

4. A jitter alleviating system for a scope comprising, means for generating sweep pulses connected to said scope, means for generating gated pulses connected to the input of said means for generating sweep pulses to control said sweep pulses, means for generating lock-out pulses connected to said means for generating gated pulses, said means for generating lock-out pulses actuated by the trailing edge of each of said gated pulses, means for generating random pulses, means for intermittently blocking said random pulses connected to said means for generating random pulses and connected to said means for generating lock-out pulses to block said random pulses that occur during a lock-out pulse, and the output of said means for controlling random pulses connected to the input of said means for generating gated pulses so that said gated means are actuated only by unblocked random pulses.

References Cited in the file of this patent

UNITED STATES PATENTS

| | | |
|---|---|---|
| 2,141,343 | Campbell | Dec. 27, 1938 |
| 2,418,521 | Morton et al. | Apr. 8, 1947 |
| 2,419,570 | Labin et al. | Apr. 29, 1947 |
| 2,480,582 | Houghton | Aug. 30, 1949 |
| 2,562,295 | Chance | July 31, 1951 |
| 2,595,667 | Gaines | May 6, 1952 |